US012228269B2

(12) United States Patent
Toledo

(10) Patent No.: US 12,228,269 B2
(45) Date of Patent: Feb. 18, 2025

(54) ULTRAVIOLET LIGHT SOURCE SPRAY BOTTLE MOUNT

(71) Applicant: Penthe Company, Walpole, MA (US)

(72) Inventor: David Paul Toledo, Salt Lake City, UT (US)

(73) Assignee: Penthe Company, Walpole, MA (US)

( * ) Notice: Subject to any disclaimer, the term of this patent is extended or adjusted under 35 U.S.C. 154(b) by 272 days.

(21) Appl. No.: 17/455,394

(22) Filed: Nov. 17, 2021

(65) Prior Publication Data

US 2022/0152672 A1 May 19, 2022

Related U.S. Application Data

(60) Provisional application No. 63/115,533, filed on Nov. 18, 2020.

(51) Int. Cl.

| | |
|---|---|
| ***F21V 21/08*** | (2006.01) |
| ***B08B 3/02*** | (2006.01) |
| ***B08B 13/00*** | (2006.01) |
| *F21V 21/088* | (2006.01) |

(52) U.S. Cl.

CPC .......... *F21V 21/0808* (2013.01); *B08B 3/028* (2013.01); *B08B 13/00* (2013.01); *F21V 21/0885* (2013.01)

(58) Field of Classification Search

CPC ... F21V 21/0808; F21V 21/0885; B08B 3/04; B08B 13/00

See application file for complete search history.

(56) References Cited

U.S. PATENT DOCUMENTS 3,713,614 A * 1/1973 Taylor ..................... F21L 4/005 248/205.3
4,894,941 A * 1/1990 Karow, Jr. ................ F41G 1/35 362/110
5,103,384 A * 4/1992 Drohan .................. F16M 11/14 362/418

(Continued)

FOREIGN PATENT DOCUMENTS

CN 216937289 U 7/2022
KR 477931 Y1 * 8/2015 ............. A42B 3/044

OTHER PUBLICATIONS

Amazon.com, Streamlight 88071 ProTac Rail Mount HL-X (Year: 2019).*

(Continued)

*Primary Examiner* — Joseph L. Perrin
*Assistant Examiner* — Kevin G Lee
(74) *Attorney, Agent, or Firm* — AVEK IP, LLC

(57) ABSTRACT

A flashlight mount for mounting an ultraviolet flashlight to a cleaning device. The flashlight mount comprises a light source coupling portion. The light source coupling portion includes at least two arms and a retention piece disposed between the at least two arms. Each of the at least two arms includes a concave inner surface. The concave inner surfaces of the at least two arms and the retention piece collectively form a socket for retaining the ultraviolet flashlight. The flashlight mount includes a cleaning device coupling portion disposed below the socket. The cleaning device coupling portion includes a recessed surface having a first ridge and a second ridge extending at opposite sides of the recessed surface.

19 Claims, 6 Drawing Sheets

(56) References Cited

U.S. PATENT DOCUMENTS

| | | | | | |
|---|---|---|---|---|---|
| D370,740 | S * | 6/1996 | Rance | D26/138 | |
| 6,616,294 | B1 * | 9/2003 | Henry | F21V 21/084 | 2/6.2 |
| D884,261 | S * | 5/2020 | Long | D26/138 | |
| 2007/0137087 | A1 * | 6/2007 | Florea | F41G 11/004 | 42/72 |
| 2014/0246512 | A1 * | 9/2014 | DeGeorge | F21V 33/0004 | 239/71 |
| 2017/0071279 | A1 * | 3/2017 | Zimmer | A42B 3/0453 | |

OTHER PUBLICATIONS

Notice of Allowance, dated May 31, 2022, 5 pages, issued in CN application No. 202122832940.5.

* cited by examiner

ULTRAVIOLET LIGHT SOURCE SPRAY BOTTLE MOUNT

RELATED APPLICATIONS

This application claims priority to U.S. Provisional Patent Application No. 63/115,533 filed Nov. 18, 2020, the disclosure of which is incorporated by reference herein in its entirety.

FIELD OF THE DISCLOSURE

The disclosure relates generally to systems and methods for aiding in the detection of stains.

SUMMARY

The following presents a simplified summary of the invention to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

In an embodiment, a flashlight mount for mounting an ultraviolet flashlight to a cleaning device comprises a light source coupling portion. The light source coupling portion includes at least two arms and a retention piece disposed between the at least two arms. Each of the at least two arms includes a concave inner surface. The concave inner surfaces of the at least two arms and the retention piece collectively form a socket for retaining the ultraviolet flashlight. The flashlight mount includes a cleaning device coupling portion disposed below the socket. The cleaning device coupling portion includes a recessed surface having a first ridge and a second ridge extending at opposite sides of the recessed surface.

In another embodiment, a flashlight mount for mounting a flashlight to a cleaning device comprises a light source coupling portion having a socket for mounting a flashlight. The flashlight mount includes a cleaning device mounting portion having a surface comprising adhesive for securing the flashlight mount to the cleaning device such that the flashlight is aligned with a spray nozzle of the cleaning device.

In yet another embodiment, a flashlight mounting system for mounting an ultraviolet flashlight to a cleaning device comprises a flashlight mount. The flashlight mount includes a light source coupling portion comprising at least two arms and a receptacle for retaining the ultraviolet flashlight. The flashlight mount comprises a cleaning device coupling portion disposed below the receptacle. The cleaning device coupling portion is adhesively secured to the cleaning device. The flashlight mounting system includes an ultraviolet flashlight.

DETAILED DESCRIPTION

Odors caused by spillages and stains (e.g., food or drink stains, bodily fluid stains from pets, etc.) are a common household nuisance. These stains may also damage the underlying surfaces, especially if left unattended for extended periods of time. There are many methods of addressing such stains, such as cleaning of the stains using a cleaning apparatus, masking the odor of the stains by adding fragrance that overpowers the undesirable smell, purifying the air of odors, et cetera. Each of these methods has its own advantages and disadvantages. For example, one cleaning method may be easier to employ than other methods, may be more cost effective, may provide for a longer lasting solution, and so on.

To effectively address these stains using any method, one must first find the location of said stain. In some cases, the stain may be visually detected with ease, such as when the stain causes a discoloration in the underlying surface. In other cases, the stain may not be readily evident, such as a stain that has dried upon a dark surface.

Many stains, such as those caused by bodily excretions (e.g., from pets), fluoresce under ultraviolet light. For example, ultraviolet light may cause proteins and phosphorus in bodily fluid stains to glow. Therefore, ultraviolet light, e.g., UV-A (315-400 nm), may aid in locating a stain that is not readily visible to the naked human eye. In embodiments of the present disclosure, to aid in the locating and cleanup of stains, a cleaning device (e.g., a spray bottle comprising cleaning fluid) may have an ultraviolet or other light integrated therewith. In other embodiments, a universal mount may be provided to removably or fixedly couple an ultraviolet or other light to a cleaning device. Stains may thus be more easily detected, and the cleanup thereof may be facilitated using the contents of the cleaning device.

In embodiments, an ultraviolet light within the UV-A spectrum of 315-400 nanometers may be operably joined to a cleaning device that disperses a fluid. The fluid may comprise one or more of a detergent, an enzyme, a fragrance, a solvent, or other substance(s) that are useful in countering stains or their byproducts (e.g., odors).

Figure 1:
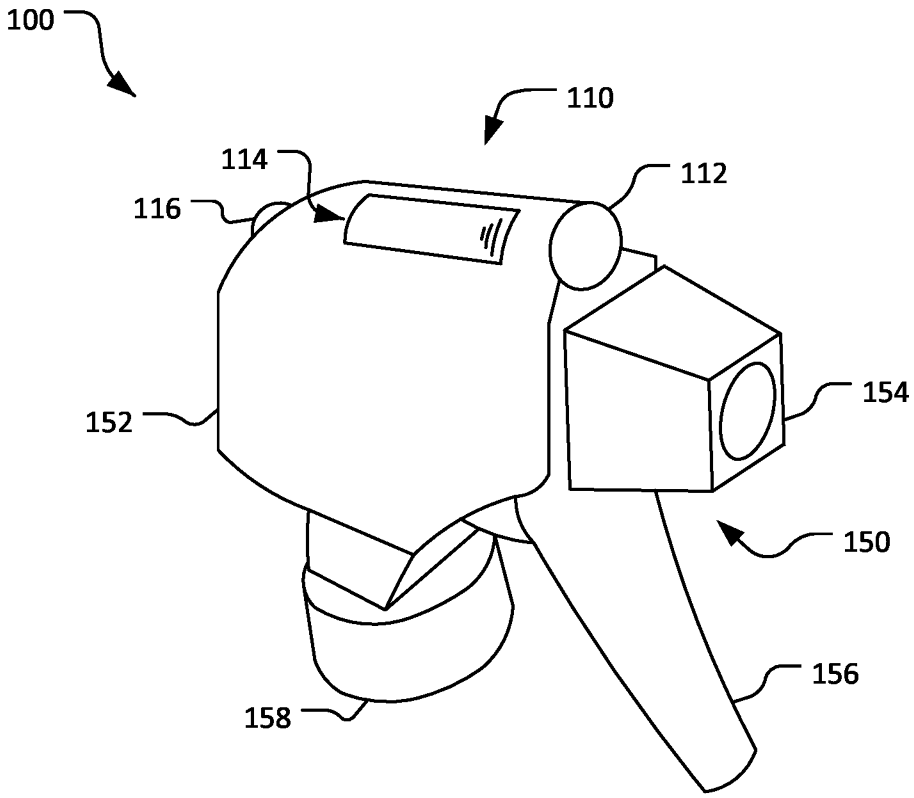
FIG. 1 is a perspective view of a light source assembly integrated with a sprayer head, according to an embodiment of the present disclosure.

FIG. 1 shows an embodiment of a cleaning assembly 100 having a light 110 that is integrated with a cleaning device 150. The components of the light 110 may be made part of or housed within a sprayer head housing 152 of the cleaning device 150. In the embodiment depicted in FIG. 1, the cleaning device 150 is a sprayer head that may be removably coupled to a spray bottle (e.g., bottle 260 of FIG. 4), and the light 110 is integrated with the sprayer head housing 152. The sprayer head housing 152 comprises a spray nozzle 154, a spray trigger 156, and a mounting element 158 for mounting the sprayer head housing 152 to the spray bottle containing the cleaning fluid. In other embodiments, the cleaning device 150 may be a spray bottle with an integrated sprayer head, another appropriate cleaning device (e.g., a mop, a brush, etc.), or a suitable cleaning device component.

The light 110 of the cleaning assembly 100 may comprise a UV emitter 112 powered by a battery 114. While only a single UV emitter 112 is depicted in FIG. 1, any suitable number of emitters 112 may be used in the light 110. A switch, button, or other actuating device 116 may be provided to enable a user to selectively power the UV emitter 112 with the battery 114.

In some embodiments, the UV emitter 112 may be operable in a plurality of lighting modes. For instance, the user may use the switch or button 116, or a different device, to change the number of lights that are illuminated, or to selectively alter the shape, type, or direction of the light pattern. Such flexibility may allow the user to select a lighting setting better suited to the cleaning job at hand.

The battery 114 may, in embodiments, be fixedly coupled to the housing 152. In other embodiments, the battery 114 may be replaceable, rechargeable, or both. When the battery 114 is rechargeable, the cleaning assembly 100 may be coupled in a wired or wireless manner to an external power source, e.g., via a charging port. When the battery 114 is removable and replaceable (e.g., an alkali battery), the cleaning device 100 may include a port or door through which a user may selectively access the battery 114 for the replacement thereof.

Figure 2:
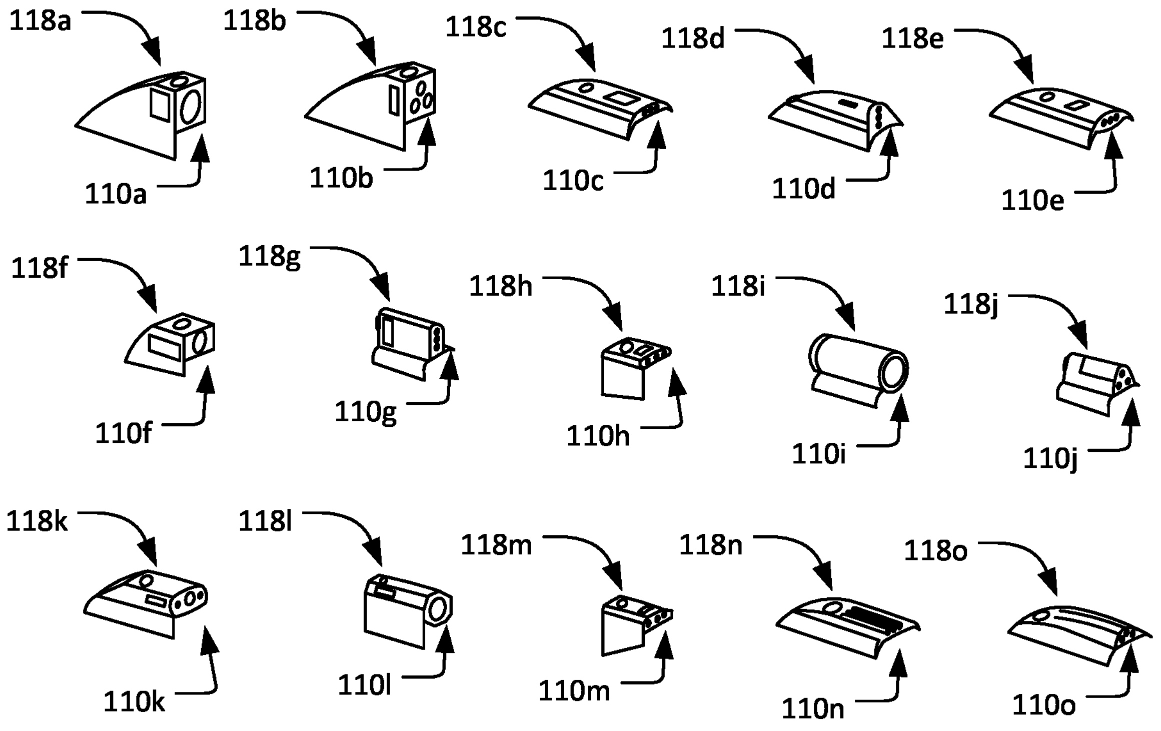
FIG. 2 is a perspective view of variations of the integrated light source assembly of FIG. 1.

Focus is directed now to FIG. 2. In some embodiments, an ultraviolet light may be part of an emitter housing that is separate and distinct from the cleaning device (e.g., cleaning device 150). FIG. 2 shows emitter housings 118*a*-118*o* having ultraviolet lights 110*a*-110*o*, respectively. Each emitter housing 118*a*-118*o* may be directly coupled to the cleaning device (e.g., a sprayer head of a spray bottle). The coupling of the housings 118*a*-118*o* to the cleaning device may be effectuated via mechanical methods (e.g., friction fitting, male/female interlocking parts, etc.), magnets, adhesives, et cetera. In this manner, the lights 110*a*-110*o* (including the UV emitter and the power source thereof) may be selectively attached to a variety of cleaning devices as desired by a user, without having to modify the cleaning device itself. The artisan will understand that the emitter housings 118*a*-118*o* shown in FIG. 2 are merely exemplary and that other emitter housings may likewise be employed, e.g., to account for cleaning devices of varying types, shapes, and sizes.

In some embodiments, the emitter housing (e.g., any of emitter housings 118*a*-118*o*) may be adjustable. That is, a user may manipulate a portion, dimension, or both of the UV emitter housing 118*a*-118*o* to cause it to fit a given cleaning device. In embodiments, the emitter housings 118*a*-118*o* may be coupled to a cleaning device such that the emitter housing and the cleaning device to which it is coupled appear to be of unitary construction.

Figure 3A:
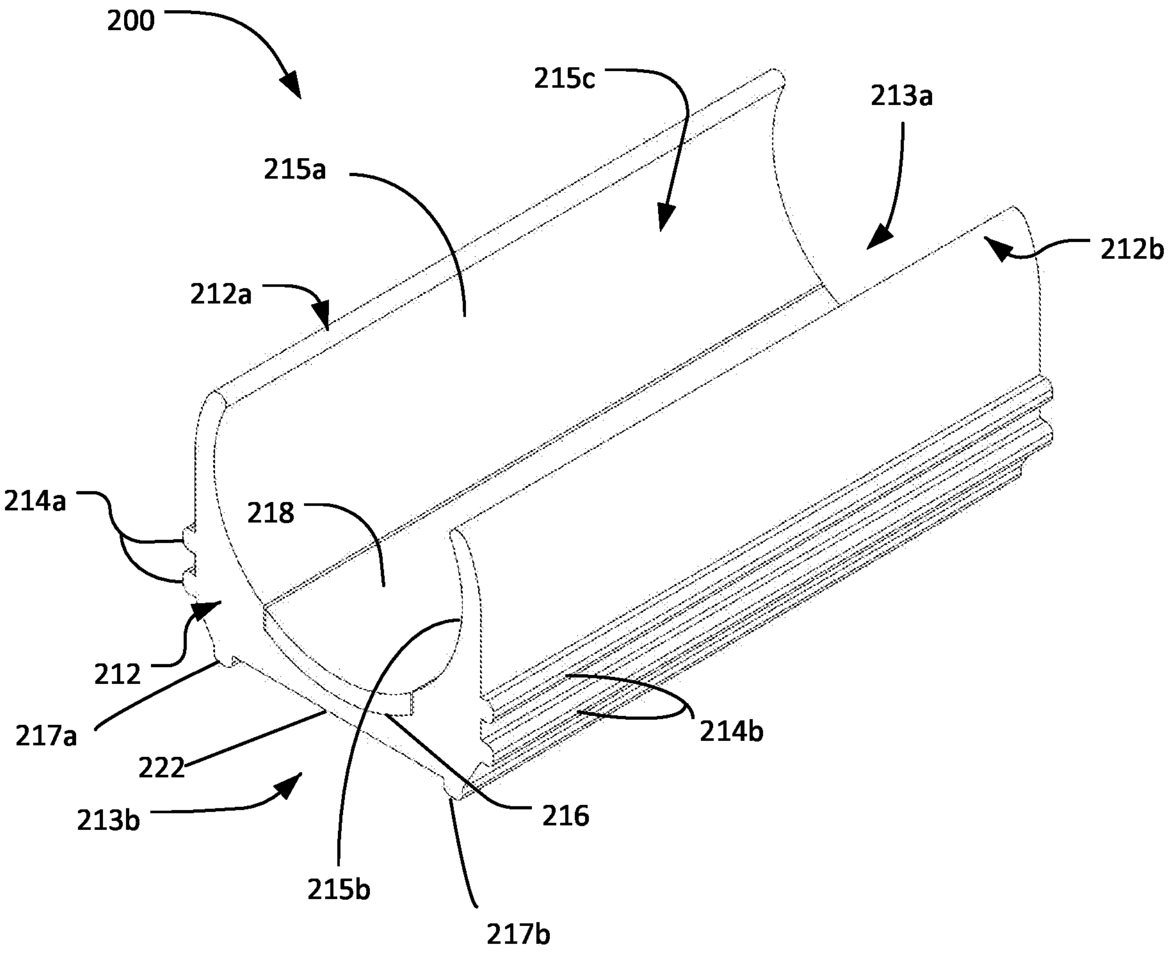
FIG. 3A is a perspective view of a bracket of a light source mount system, according to another embodiment of the present disclosure.
Figure 3B:
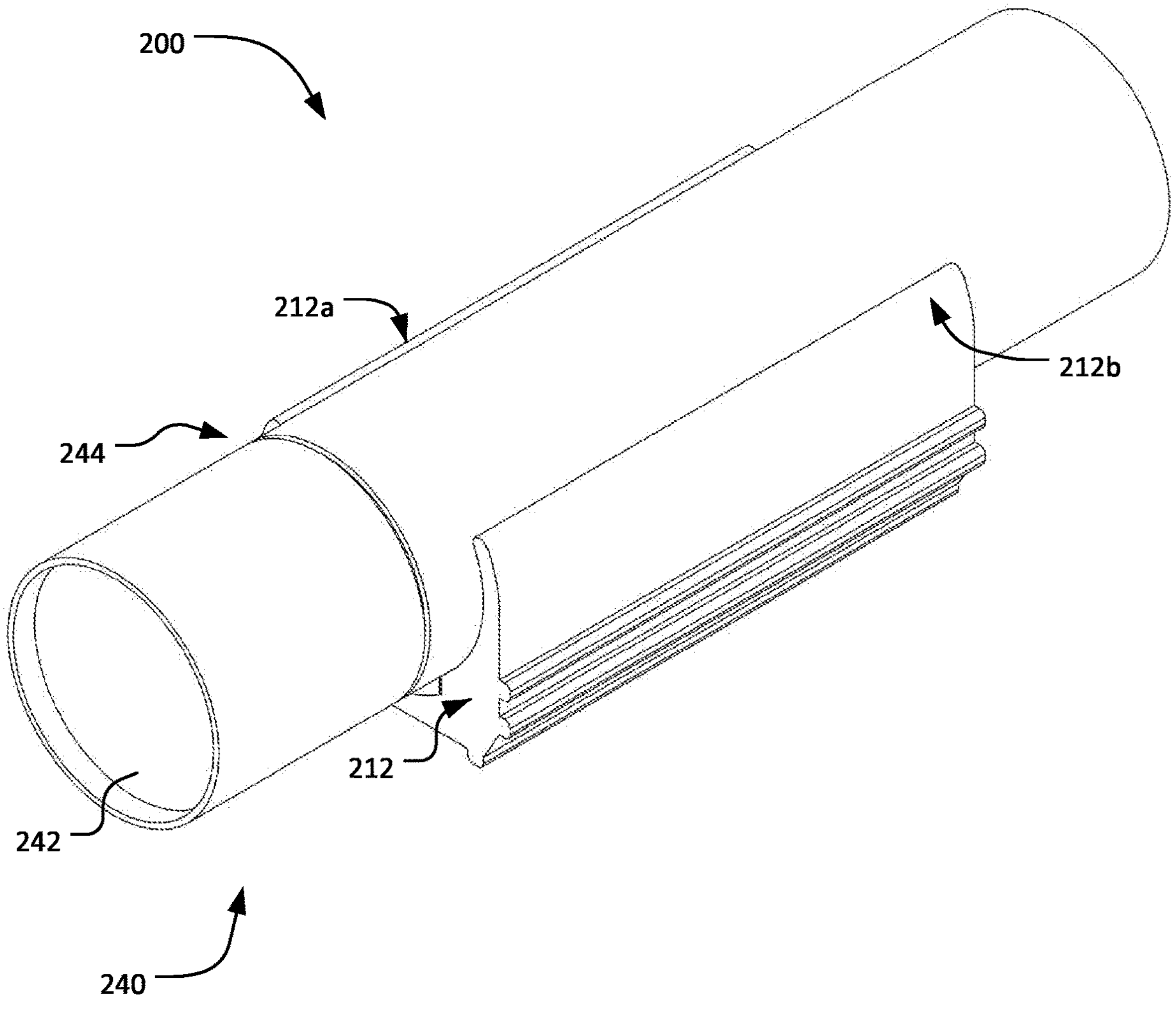
FIG. 3B is a perspective view of the bracket of FIG. 3A shown with a light source coupled thereto.
Figure 3C:
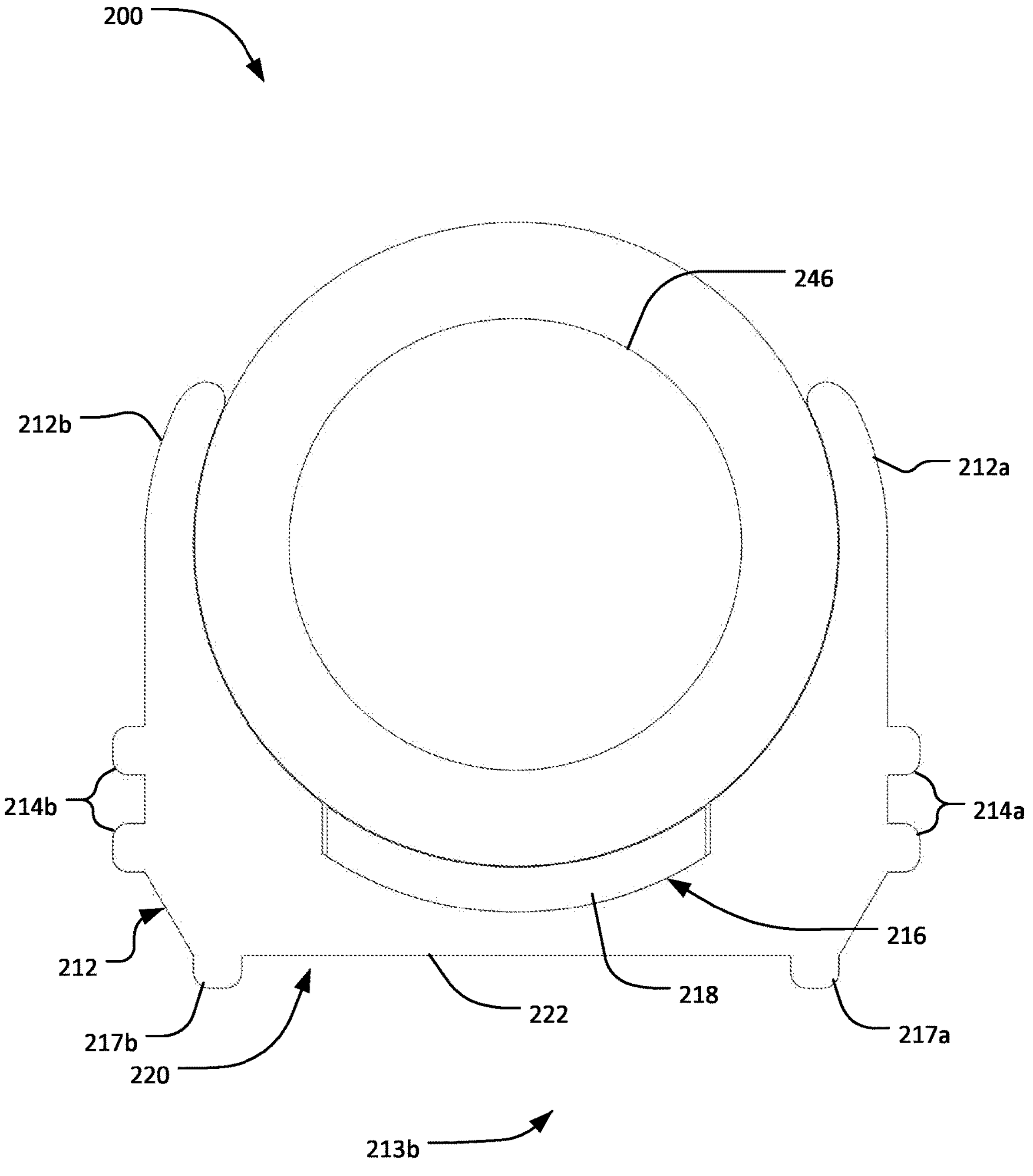
FIG. 3C is a rear view of the bracket and light source of FIG. 3B.
Figure 4:
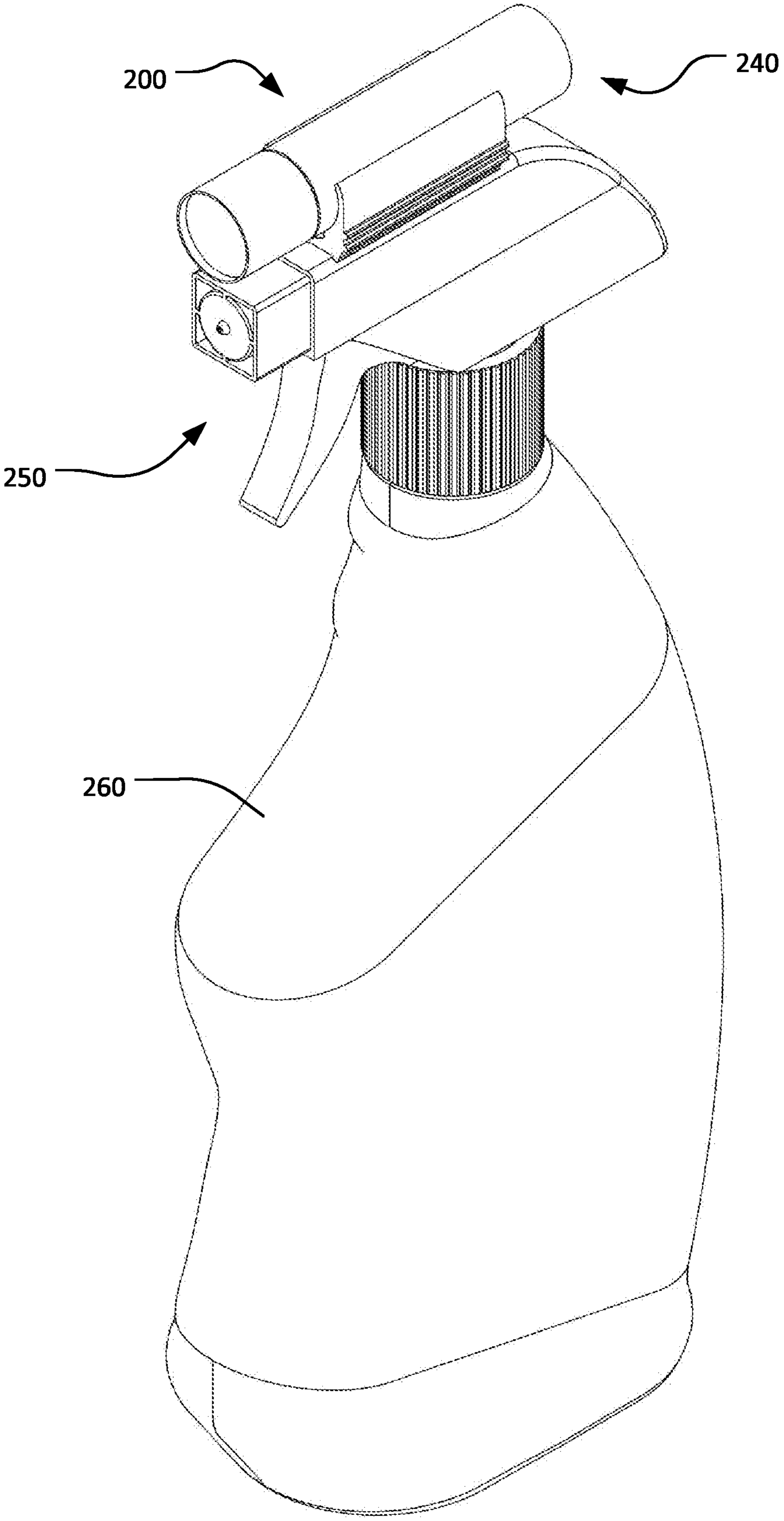
FIG. 4 is a perspective view of the bracket and light source of FIG. 3B coupled to a cleaning device.

FIGS. 3A, 3B, 3C and 4 depict an embodiment 200 of a universal mounting bracket for enabling a UV light source to be indirectly coupled to a cleaning device. For example, as shown in FIG. 3B, a UV or other light source 240 may be removably or permanently coupled to the universal mounting bracket 200, and as shown in FIG. 4, the mounting bracket 200, together with the light source 240, may be removably or permanently coupled to a cleaning device 250 (e.g., a sprayer head of a spray bottle 260). In some embodiments, the bracket (or mount) 200 may first be coupled to the cleaning device 250 and the light source 240 may thereafter be coupled to the bracket 200. In the illustrated embodiment, and as discussed in more detail herein, the light source 240 is mechanically coupled to the mount 200 and the mount 200 is adhesively coupled to the cleaning device 250. The cleaning device 250 may be the sprayer head of the spray bottle 260 as shown in FIG. 4, or other cleaning devices as discussed above.

The light source 240 (FIG. 3B), akin to the light source 110, may include one or more UV emitters 242, a power source compartment 244, and an actuator 246 (FIG. 3C). The light source 240 may, in embodiments, be a generally cylindrical ultraviolet flashlight or another flashlight. The light source 240 may take on other suitable shapes (e.g., the light source may have a cylindrical compartment for housing batteries and a conical compartment for housing UV emitters). The light source 240 may be powered using DC power (e.g., batteries), AC power, or both. Where the light source 240 is powered via batteries, the batteries may be replaceable. Alternately or in addition, where the power source powering the light source 240 is rechargeable, a charging device may be provided to allow the power source to be charged in a wired or wireless manner.

As shown in FIG. 3A, the mount 200 may, in embodiments, have a body 212. The body 212 may comprise plastic, wood, metal, or other desirable materials. In embodiments, the body 212 may have a light source coupling portion 213*a* and a cleaning device coupling portion 213*b*. The light source coupling portion 213*a* may allow for a light source, e.g., light source 240, to be coupled to the mount 200 and be retained thereby. The cleaning device coupling portion 213*b* may allow for the mount 200 to be coupled to a cleaning device, e.g., cleaning device 250.

In embodiments, the light source coupling portion 213*a* comprises arms 212*a* and 212*b* and a retention piece 218.

Arms 212*a* and 212*b* may be generally identical. Arm 212*a* may have an inner surface 215*a* and arm 212*b* may have an inner surface 215*b* that faces the inner surface 215*a*. The inner surface 215*a* of the arm 212*a* may originate at one end of the retention piece 218 and the inner surface 215*b* of the arm 212*b* may originate at the opposite end of the retention piece 218. Each inner surface 215*a* and 215*b* may be arced or have at least one generally concave section. In embodiments, each of the arms 212*a* and 212*b* (and the inner surfaces 215*a*, 215*b* thereof) and the retention piece 218 may extend generally along the entire length of the body 212. The arm inner surfaces 215*a*, 215*b* and the retention piece 218 may therefore collectively form a generally U-shaped or frustocylindrical socket 215*c* or receptacle for the retention of the light source 240 within the mount 200.

In embodiments, the arms 212*a* and 212*b* may elastically deform temporarily to allow the flashlight 240 to be pushed into the socket and be retained therein. Thus, when the light source 240 is pushed down into the socket 215*c*, the arms 212*a* and 212*b* may temporarily move away from the retention piece 218 to allow the light source 240 to be accommodated within the socket 215*c*. Once the light source 240 is retained within the socket 215*c*, the arms 212*a*, 212*b* may snap back and return to their original position (or rest proximate their original position) such that the inner surfaces 215*a*, 215*b* of the arms 212*a*, 212*b* contact and grip the light source 240.

A slot 216 that extends along the length of the mount 200 may be provided in the body 212 between the arm inner surfaces 215*a* and 215*b*. The retention piece 218 may be disposed within the slot 216. The retention piece 218 may assist in retaining the light source 240 within the slot 215*c*. In embodiments, the retention piece 218 is a piece of rubber that provides resistance to movement of the light source 240 while the light source 240 is retained within the light source coupling portion 213*a*. In other embodiments, the retention piece 218 may magnetically or adhesively attach to the light source 240 and help ensure the light source 240 does not fall out of the light source coupling portion 213*a*.

The mount 200, via its arms 212*a*, 212*b* and retention piece 218, may hold the flashlight 240 in a desirable orientation relative to the cleaning device 250, such that the UV emitter 242 (FIG. 3B) is generally parallel to the spraying direction of the cleaning device 250. As described, the arms 212*a*, 212*b* may hold the flashlight 240 mechanically (e.g., by gripping the sides of the flashlight 240) and the retention piece 218 may hold the flashlight 240 mechanically, adhesively, magnetically, or using other techniques. While not required, a length of the flashlight 240 may be greater than a length of the mount 200. It will be appreciated that the flashlight 240 may be removable from the mount 200 and may be replaced, e.g., when the light(s) 242 thereof have depleted.

In embodiments, the outer surface of arm 212*a* may comprise ridges or protrusions 214*a* and the outer surface of arm 212*b* may comprise ridges or protrusions 214*b* (FIG. 3A). The ridges 214*a* and 214*b* may extend along the length of the body 212. The ridges 214*a* may face away from the inner surface 215*a* of the arm 212*a* and the ridges 214*b* may face away from the ridges 214*a* and the inner surface 215*b* of the arm 212*b*. The ridges 214*a* and 214*b* may allow a user to grip the mount 200 with ease (e.g., while the user is coupling the mount 200 to the cleaning device 250).

As noted, the cleaning device coupling portion 213*b* may allow for the mount 200 to be coupled to the cleaning device 250. This coupling may be permanent or temporary.

In embodiments, the cleaning device coupling portion 213*b* may comprise a lower portion 220 of the mount 200 (FIG. 3C). The mount lower portion 220 may comprise alignment ridges 217*a* and 217*b* that face generally in a downward direction and an attachment surface 222 that extends therebetween. The alignment ridges 217*a*, 217*b* and the attachment surface 222 between the alignment ridges 217*a*, 217*b* may extend along the length of the body 212.

The attachment surface 222 may, in embodiments, be recessed, and may be attached to the cleaning device 250. For example, the attachment surface 222 may comprise a layer of adhesive that allows the mount 200 to be adhesively coupled to the top (or the left or right side) of the cleaning device 250 (see FIG. 4). Alternately, or in addition, different attachment means may be provided (e.g., hook and loop fasteners, pins, snap-fit devices, et cetera) to effectuate the coupling of the mount 200 to the cleaning device 250. Where the attachment surface 222 comprises adhesive, a removable release liner may be provided to prevent the mount 200 from undesirably attaching to surfaces other than the desired surface of the cleaning device 250.

The alignment ridge 217*a* may be associated with arm 212*a* and the alignment ridge 217*b* may be associated with arm 212*b*. The alignment ridges 217*a*, 217*b* may collectively assist the user in securing (e.g., adhesively) the mount 200 to the cleaning device 250 such that the light 242 is pointed in a direction generally parallel to the spraying direction of the cleaning device 250. When the mount 200 is being coupled to the cleaning device 250, the user may employ the alignment ridges 217*a*, 217*b* to ensure that the distance between the alignment ridges 217*a*, 217*b* and the surface of the cleaning device 250 to which the mount 200 is being secured is generally the same for the entire length of the alignment ridges 217*a* and 217*b*; such may ensure proper alignment between the mount 200 and the spraying direction of the cleaning device 250.

In the embodiment illustrated in FIGS. 3A-3C and 4, once the mount 200 is coupled to the cleaning device 250, the user may activate the light source 240 and spray the cleaning fluid via the cleaning device 250 using one hand, leaving the other hand free to wipe the stain or engage in other cleaning activity. For example, the user may use a thumb of the user to power on the light source 240 via the actuator 246 (FIG. 3C) and use the fingers of the same hand to spray the cleaning fluid at locations where stains are found via the spray trigger. The mount 200 may thus allow the user to locate and clean the stains in an efficient manner.

As shown in FIG. 3B, the light source 240 is cylindrical. Therefore, the illustrated socket 215 (FIG. 3A) is generally U-shaped so as to accommodate and retain the cylindrical light source 240. In other embodiments, a light source having a different shape may be used, and the shape of the socket 215 may be correspondingly altered to allow this light source to be retained within the socket 215. For example, the light source 240 may be in the shape of a cuboid, and the socket 215 may be squared to retain the cuboid-shaped flashlight.

Thus, as has been described, a light source 240 may be coupled to the light source coupling portion 213*a* of the mount 200, and the mount 200 (together with the light source 240) may in-turn be coupled to the cleaning device 250 via the cleaning device coupling portion 213*b* of the mount 200. The user may activate the light source 240 (e.g., a UV or other light source) to identify the location of stain(s) and use the cleaning device 250 to disperse cleaning fluid to this targeted location. The light source 240 may be activated and the cleaning fluid may be dispensed using one hand, and the mount 200 may maintain proper alignment between the light source 240 and the cleaning device 250 thereby ensuring the cleaning fluid is sprayed at the general location illuminated by the light source 240.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims.

The invention claimed is:

1. A flashlight mount for mounting an ultraviolet flashlight to a cleaning device, comprising:

a light source coupling portion comprising:

at least two arms each including a concave inner surface; and a recessed slot extending along an entire length of the flashlight mount and configured to secure a concave retention piece insertable in the recessed slot, the retention piece and the concave inner surfaces of the at least two arms collectively forming a socket for retaining the ultraviolet flashlight; and a cleaning device coupling portion disposed below the socket, the cleaning device coupling portion comprising a flat recessed surface having a first ridge and a second ridge extending at opposite sides of the recessed surface, the recessed surface having an adhesive for coupling the cleaning device coupling portion to a cleaning device;

wherein:

the first ridge and the second ridge are configured to maintain a constant spacing between each of the first ridge, the second ridge, and the cleaning device when the cleaning device coupling portion is adhesively coupled to the cleaning device;

a height of each of the first ridge and the second ridge is less than twice a width of each of the first ridge and the second ridge; and a width of the recessed surface is at least four times the height of each of the first ridge and the second ridge.

2. The flashlight mount of claim 1, wherein the socket is U-shaped.

3. The flashlight mount of claim 1, further comprising the ultraviolet flashlight retained in the socket.

4. The flashlight mount of claim 3, wherein the ultraviolet flashlight is removable from the socket.

5. The flashlight mount of claim 3, wherein the retention piece resists movement of the ultraviolet flashlight within the socket.

6. The flashlight mount of claim 3, wherein the cleaning device is a sprayer head of a spray bottle.

7. The flashlight mount of claim 6, wherein the flashlight mount is adhesively coupled to a top of the sprayer head.

8. The flashlight mount of claim 1, wherein the first ridge and the second ridge extend in a first direction.

9. The flashlight mount of claim 8, further comprising at least one gripping ridge extending in a second direction disparate from the first direction.

10. The flashlight mount of claim 9, wherein the at least one gripping ridge extends along the entire length of the flashlight mount.

11. A flashlight mount for mounting a flashlight to a cleaning device, comprising:

a light source coupling portion having two curved arms and a recessed slot extending along an entire length of the flashlight mount, the recessed slot being configured to retain a retention piece, the two curved arms and the retention piece forming a socket for mounting the flashlight; and a cleaning device mounting portion having a surface comprising adhesive for securing the flashlight mount to the cleaning device such that the flashlight is aligned with a spray nozzle of the cleaning device, the surface having alignment ridges extending from opposing ends of the surface;

wherein:

a height of each of the alignment ridges is less than twice a width of each of the alignment ridges; and a width of the surface is at least four times the height of each of the alignment ridges.

12. The flashlight mount of claim 11, wherein the flashlight is removably retained within the socket.

13. The flashlight mount of claim 11, wherein the flashlight is mechanically coupled to the socket.

14. The flashlight mount of claim 11, wherein the flashlight is wirelessly chargeable.

15. The flashlight mount of claim 11, wherein the flashlight extends beyond the flashlight mount when the flashlight is retained within the socket.

16. The flashlight mount of claim 11, wherein the flashlight emits a light in the range of 315-400 nanometers.

17. The flashlight mount of claim 11, wherein the surface is a flat surface.

18. A flashlight mounting system for mounting an ultraviolet flashlight to a cleaning device, comprising:

a flashlight mount, comprising:

a light source coupling portion for retaining the ultraviolet flashlight, the light source coupling portion comprising at least two arms and a retention piece disposed in a recessed slot extending along an entire length of the flashlight mount; and a cleaning device coupling portion disposed below the retention piece, the cleaning device coupling portion having a surface, the surface having alignment ridges extending from opposing ends of the surface, the cleaning device coupling portion configured to be adhesively secured to the cleaning device, wherein a width of the surface is at least four times the height of each of the alignment ridges.

19. The flashlight mounting system of claim 18, wherein each of the at least two arms comprises an arced inner surface corresponding to a shape of the ultraviolet flashlight.

* * * * *